(12) United States Patent
Rajagopalan et al.

(10) Patent No.: US 10,795,904 B2
(45) Date of Patent: Oct. 6, 2020

(54) OBJECT SEARCH ON PARTIAL DATA RECEIVED FROM EXTERNAL SYSTEM

(71) Applicant: SAP SE, Walldorf (DE)

(72) Inventors: Nithya Rajagopalan, Bangalore (IN); Abhishek Chaturvedi, Bangalore (IN); Sunil Gornalle, Bangalore (IN); Prasad Karani, Karnataka (IN); Surendranath Gopinathan, Bangalore (IN); Gurudayal Khosla, Bangalore (IN)

(73) Assignee: SAP SE, Walldorf (DE)

( * ) Notice: Subject to any disclaimer, the term of this patent is extended or adjusted under 35 U.S.C. 154(b) by 145 days.

(21) Appl. No.: 16/185,872

(22) Filed: Nov. 9, 2018

(65) Prior Publication Data
US 2020/0151262 A1 May 14, 2020

(51) Int. Cl.
| | | |
|---|---|---|
| *G06F 16/00* | (2019.01) | |
| *G06F 16/25* | (2019.01) | |
| *G06Q 30/06* | (2012.01) | |
| *G06F 16/2455* | (2019.01) | |
| *G06F 3/0481* | (2013.01) | |

(52) U.S. Cl.
CPC ........ *G06F 16/252* (2019.01); *G06F 16/2455* (2019.01); *G06Q 30/0603* (2013.01); *G06F 3/0481* (2013.01)

(58) Field of Classification Search
CPC .. G06F 16/2455; G06F 16/252; G06F 3/0481; G06Q 30/0603
See application file for complete search history.

(56) References Cited

U.S. PATENT DOCUMENTS

| | | | |
|---|---|---|---|
| 8,024,221 B2 * | 9/2011 | Porte | G06Q 10/0631 705/14.4 |
| 9,262,498 B2 * | 2/2016 | Ferris | H04L 29/06 |
| 9,378,359 B2 * | 6/2016 | Qureshi | H04L 9/0891 |
| 2005/0125251 A1 * | 6/2005 | Berger | G06Q 10/087 719/310 |
| 2011/0066658 A1 * | 3/2011 | Rhoads | H04N 1/32144 707/803 |

* cited by examiner

*Primary Examiner* — Cheryl Lewis
(74) *Attorney, Agent, or Firm* — Schwegman Lundberg & Woessner, P.A.

(57) ABSTRACT

In an example embodiment, a first payload in a first electronic communication is received, the first payload containing localization information regarding a first node in a taxonomy of objects, categories, and characteristics. The first payload is parsed to identify one or more dependencies. For each of the one or more dependencies, a dummy node in the taxonomy corresponding to the dependency is created, the dummy node containing information about the dependency from the first payload. A search mechanism is provided to a graphical user interface, the search mechanism designed to receive user interactions from a user and cause one or more hardware processors to retrieve and cause display of information in one or more of the dummy nodes in the taxonomy.

20 Claims, 12 Drawing Sheets

FIGURE 7B

FIGURE 7D

OBJECT SEARCH ON PARTIAL DATA RECEIVED FROM EXTERNAL SYSTEM

TECHNICAL HELD

This document generally relates to performing online searches in retail procurement systems. More particularly, this document relates to performing an object search on partial data received from an external system.

BACKGROUND

Retail procurement is a branch of supply management in which businesses (such as retailers) acquire objects from other businesses (such as distributors, wholesalers, or manufacturers). Procurement in the retail industry goes beyond a transaction-based activity, to a strategic initiative that can drive significant savings. It is becoming more prevalent for retailers to utilize software to aid in the procurement process. Indeed, as a retailer grows larger, it becomes more and more necessary to automate and simplify the retail procurement process, so software has grown more advanced in the past few years.

Goods that are bought and sold in such retail procurement systems are often called "articles," although they may also be known as "objects." Typically, these objects will have categories (and possibly subcategories) assigned to them in a taxonomy. For example, a particular brand and model of pencil may be placed in the subcategory of "pencils," which itself may be in the subcategory of "writing instruments," which itself may be in the subcategory of "office supplies."

Categories, subcategories, and objects may be assigned characteristics, such as color and size. For example, a particular brand and model of pencil may be assigned a color characteristic of "red" and a size characteristic of "small." If the pencils subcategory were to be assigned those same characteristics, that would mean that all pencil objects assigned to that subcategory share those same characteristics. Additionally, multiple characteristics may be grouped into a characteristic profile, which can also then be applied to categories, subcategories, and objects.

At the technical level, each of the category, subcategory, and object information may be obtained by the retail procurement system from an external system, such as an Enterprise Resource Planning (ERP) system. Such external systems typically communicate with the retail procurement system via the Internet, and specifically using HyperText Transfer Protocol (HTTP) packets. The ordering of such HTTP transmissions, however, is not guaranteed by most networks, and thus it is common to send packets in one order and yet have them be received (and processed) in a different order on the other end of the communication. The result is that when downloading a hierarchy of categories, subcategories, and objects, as well as obtaining and processing their respective characteristics, there is no guarantee that the various pieces of information will be received in a particular order. For example, the category for an object may be received after the object itself is received, or the category may be received first and the object after.

From the technical perspective, this makes it difficult to implement search functionalities within these retail procurement systems. Because the objects, categories, subcategories, characteristics, and characteristic profiles may have varying degrees of dependencies on one another, no object in the hierarchy is searchable until all of its dependencies are obtained and resolved, which often means that no object is searchable until after most if not all of the hierarchy data has been downloaded and processed. This creates delays and can be frustrating to users who need the search capability enabled sooner in order to use object and related information to generate events.

BRIEF DESCRIPTION OF DRAWINGS

The present disclosure is illustrated by way of example and not limitation in the figures of the accompanying drawings, in which like references indicate similar elements.

FIGS. 7A and 7B are screen diagrams illustrating graphical user interfaces for displaying search results from a partially received hierarchy in accordance with an example embodiment.

FIGS. 7C and 7D are screen diagrams illustrating further graphical user interfaces for displaying search results from a partially received hierarchy in accordance with an example embodiment.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

In an example embodiment, various mechanisms are implemented in a retail procurement system to allow users to perform searches on downloaded object and object-related data when only partial data has been downloaded or the data is otherwise incomplete.

Figure 1:
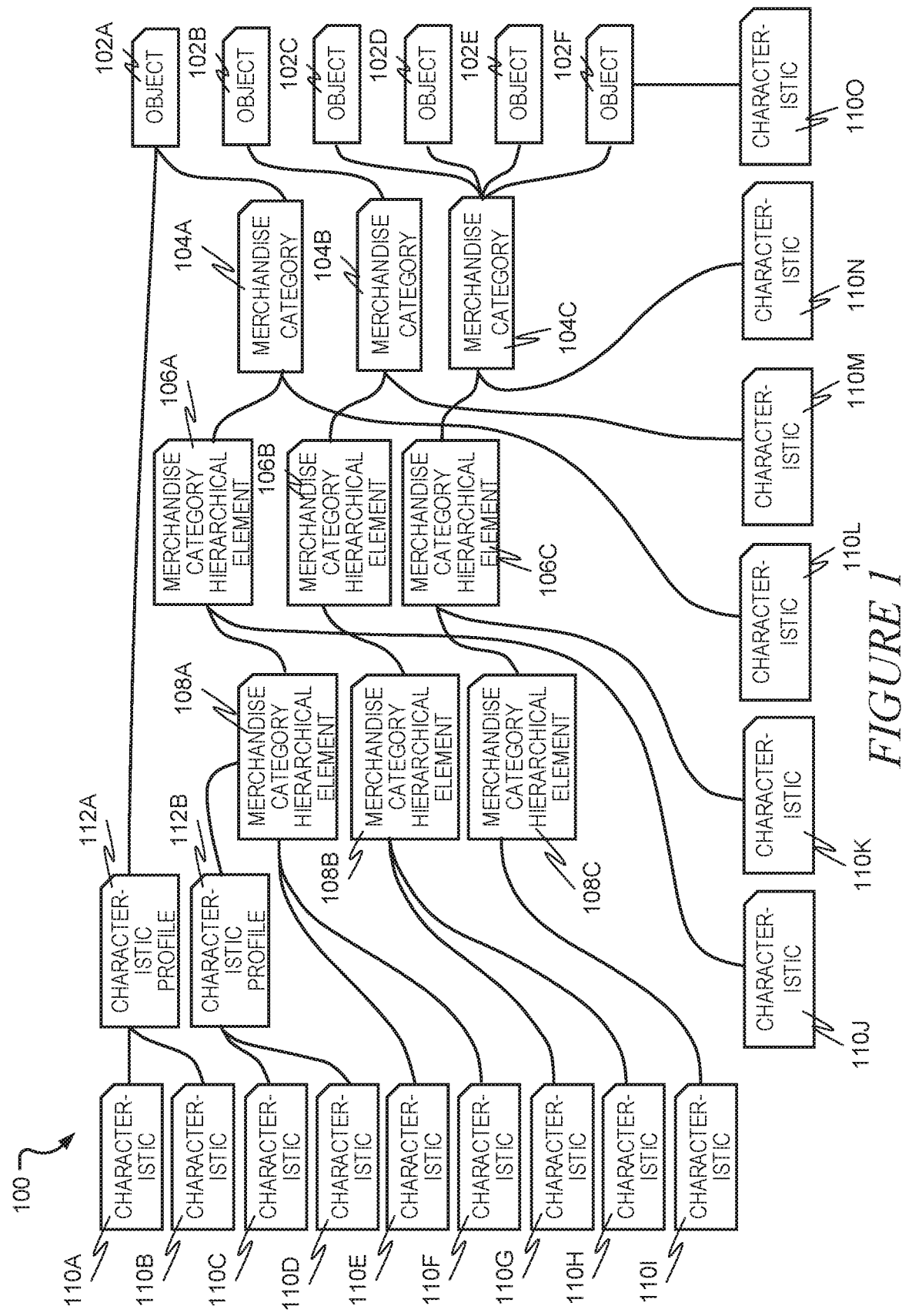
FIG. 1 is a block diagram illustrating an object hierarchy in accordance with an example embodiment.

FIG. 1 is a block diagram illustrating an object hierarchy 100 in accordance with an example embodiment. As described earlier, the object hierarchy 100 may include objects 102A-102F, which correspond to goods/articles being sold or otherwise offered in a retail procurement environment. Each object 102A-102F may be assigned to a merchandise category 104A-104C, which may each itself be assigned to a merchandise category hierarchical element 106A-106C, which may itself be assigned to a merchandise category hierarchical element 108A-108C, and so on. Additionally, characteristics 110A-110C) may be assigned to objects 102A-102F, merchandise categories 104A-104C, or merchandise category hierarchical elements 106A-106C, 108A-108C. For example, the characteristic 110O may be assigned to the object 102F, and the characteristic 110N may be assigned to the merchandise category 104C.

Additionally, certain characteristics, such as characteristics 110A-110D, may be assigned to one or more characteristic profiles 112A-112B, which then themselves can be assigned to objects, merchandise categories, and/or merchandise category hierarchical elements.

In an example embodiment, each node in the object hierarchy 100 may have a name, such as "All," "Electronics," "T-Shirts," "Pencil," etc., along with respective IDs, which may be unique in the retail procurement system. While the names of the nodes may have localized meaning (e.g., they may have the same meaning in English, Japanese, Arabic, etc.), the string literals for various translations of the names may be different, and different of these string literals may be presented to users based on location.

Thus, in the object hierarchy 100 of FIG. 1, each object 102A-102F may be dependent on one or more merchandise categories 104A-104C, which themselves can have their own dependencies and so on. Additionally, each object 102A-102F may have localization information, such as its name translated into different languages, which may be downloaded separately from the object 102A-102F itself, which may include a unique identifier. The same may be true for merchandise categories 104A-104C, merchandise category hierarchical elements 106A-106C, 108A-108C, characteristics 110A-110O, and characteristic profiles 112A-112B.

All of the leaf nodes (e.g., objects 102A-102F) in this object hierarchy 100 represent articles that can be directly added to a sourcing event upon an article master search. Alternatively, after creating an ad-hoc item, a user can search a category from this hierarchy, and respective characteristics would be copied to the event pertaining to the category. Whenever any object or category is utilized for a sourcing event, the characteristics for all parent nodes in the hierarchy are copied for that line item. For example, if the category "T-shirt" is added to the line item, then the characteristics of "T-shirt," "men's clothing," "clothing," and all node categories may also be copied.

As mentioned earlier, from the technical perspective, given the way data flows into a retail procurement system, it is not possible for an external source to send the entire hierarchy at once. Rather, the data is sent in chunks, with each chunk containing a payload for one article, one characteristic for an article ID, a relationship between article IDs, etc. Since the payloads in these chunks may be received in random order, prior-art systems would need to wait to become fully functional until all of the relevant information has been received through different payloads. The reasons for such delays and random order could vary based on factors such as delays in the external system creating the data, delays in waiting for approval in intermediate systems, network errors or delays, and the like.

In an example embodiment, techniques are used to allow searching to be performed when the payloads received are not complete enough to have all the dependencies/characteristics for each node. For example, in an example embodiment, searching is still possible if a payload showing a relationship between two objects and characteristics of the objects has been received but the article ID itself and the localization data of the characteristics still have not arrived. Likewise, searching is still possible if only relationships between article IDs have arrived but not the localization data or characteristics.

From the technical standpoint, some circumstances of partial data are relatively straightforward, while others are more complex. Several different scenarios and their respective handlings will now be described.

In a first scenario, only characteristics have arrived, along with their tag information, but not with the category associations. In this instance, the user can search only the characteristics by their tags.

In a second scenario, only the article ID and characteristic ID relationship along with the applied values for characteristics for the article have arrived, but the localization data has yet to arrive. Here, the user can search for the article by ID. On copying the article for the event, characteristics with their IDs and associated values are also copied.

In a third scenario, only the object information is received along with the category node's ID. The category node's localization information, which includes the localization data and other metadata, has yet to be received. In this case, partially linked data can be created, which is inferred through input data interpretation for the category with the received category ID. No characteristics are associated with this category, as these cannot be predicted, but the user is still free to search and add the object to the category. Upon adding the object, the user will at least have the characteristics pertaining to the selected article. The category's ID would also be set on the created line item.

Hence, the user can make use of their external system's capabilities to prioritize the data to be shown and start making use of it in their sourcing event without waiting for complete data arrival.

In an example embodiment, as each payload arrives, the retail procurement system checks if the dependent data is present or not in the system. If it is present, then its reference is used while creating the master data. If it is not present, the retail procurement system generates the partially linked data.

Other examples are hereby provided. In a first example, a category payload has arrived with a category ID C01, but the localized description has not arrived. The user is still able to search the category by its ID (C01).

In a second example, objects have arrived showing the category ID C02, but the category payload for C02 has not yet arrived. Here the user can still search the objects by their ID or name, or even search for the category C02 to see objects falling within that category.

In a third example, a characteristics payload has arrived for category C03, but the category payload still has not yet arrived. Here the user can still search for the category C03 and add it to an event, and all the identified attributes would be copied to the event.

In a fourth example, a characteristics payload has arrived but without the characteristics' localized descriptions. The user can still add these characteristics to the line item using their external IDs (not the localized descriptions).

Figure 2:
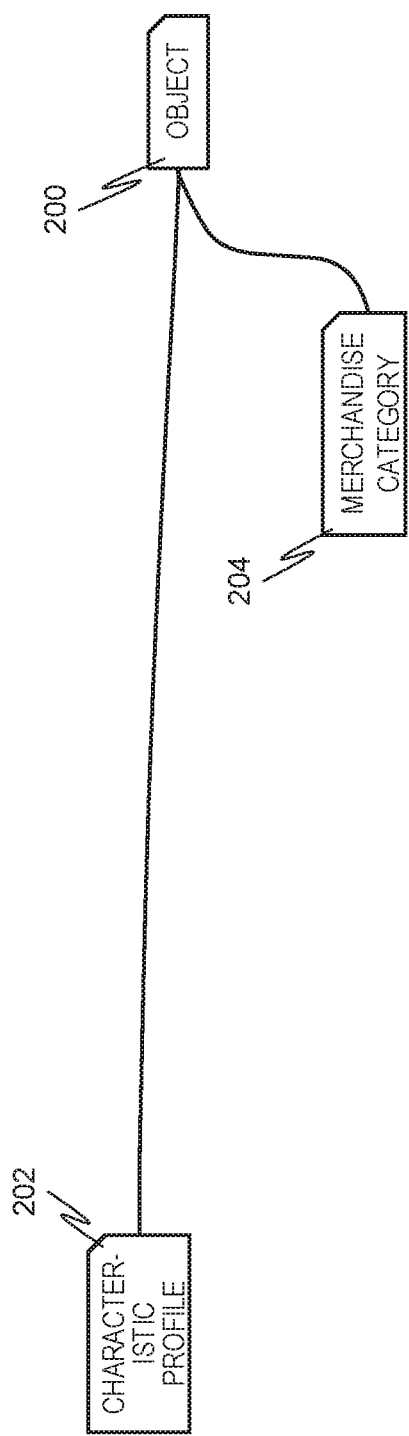
FIG. 2 is a block diagram illustrating partial receipt of a hierarchy in accordance with an example embodiment.

FIG. 2 is a block diagram illustrating partial receipt of a hierarchy in accordance with an example embodiment. Here, an object 200 has been received, including all localization information for the object 200, as well as dependency information indicating that this object 200 is assigned to a characteristic profile 202 and a merchandise category 204. Thus, if the object 200 is an XYZ model of pencils, the system may have received information about this XYZ model (e.g., its name in various languages), and received information that it has been assigned a characteristic profile with a particular ID and a merchandise category with a particular ID. However, none of the localization information about the characteristic profile or the merchandise category has been received yet. Thus, for example, the system may know that the XYZ model of pencil has been assigned a characteristic profile with an ID of 15235, but it does not yet know that the characteristic profile with an ID of 15235 pertains to objects that are small and red. The system may also know that the XYZ model of pencil has been assigned to a merchandise category of 99347, but it does not yet know that the merchandise category of 99347 pertains to objects in the "writing instruments" category. In an example embodiment, the system then creates dummy nodes, specifically a dummy node for the characteristic profile 202 and a dummy node for the merchandise category 204. While these dummy nodes will not contain their respective localization information, they may at least contain the information the system does know so far, namely their IDs and that they are assigned to the object 200. This allows for searching for the object 200.

Figure 3:
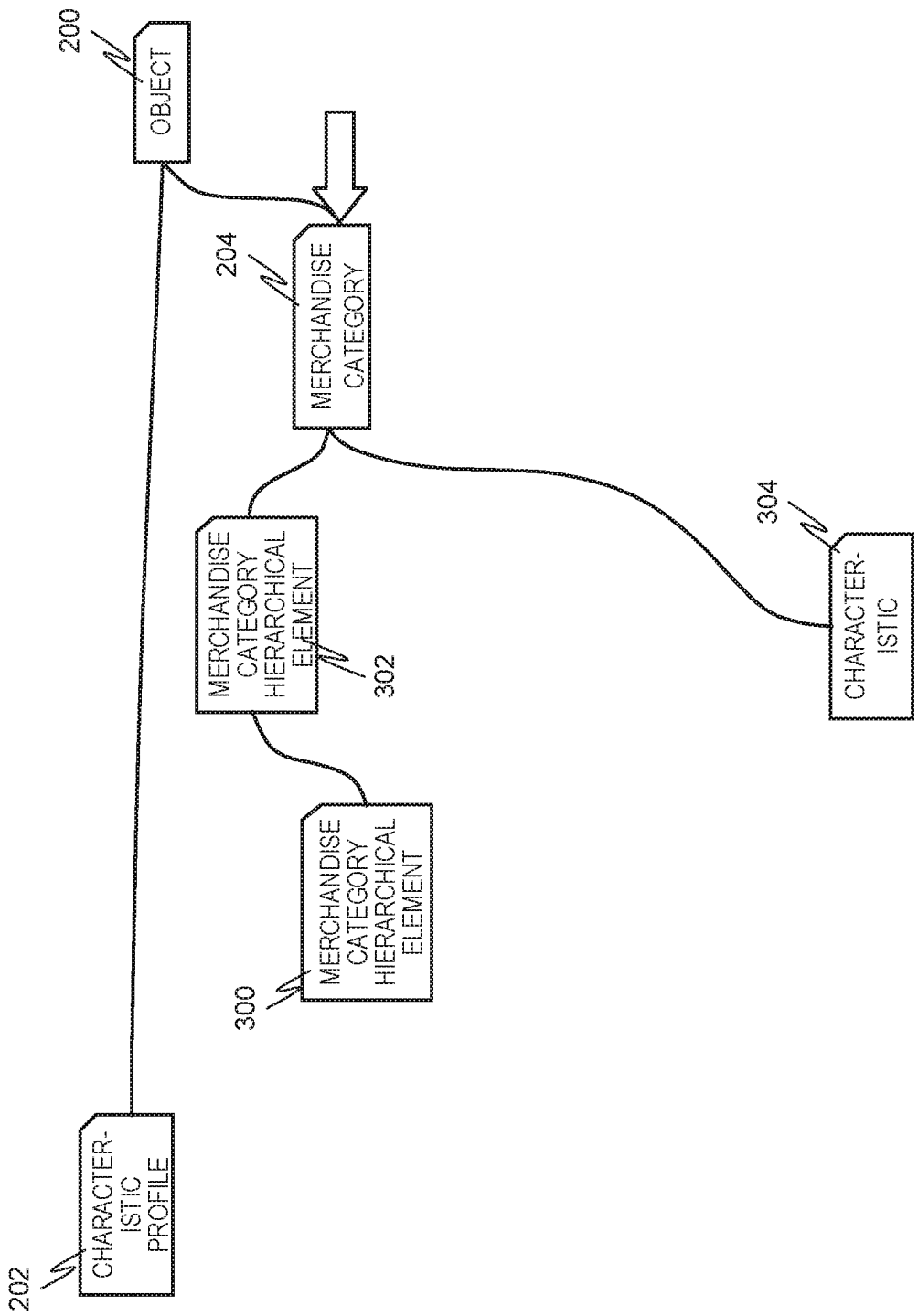
FIG. 3 is a block diagram illustrating further partial receipt of a hierarchy in accordance with an example embodiment.

FIG. 3 is a block diagram illustrating further partial receipt of a hierarchy in accordance with an example embodiment. Here, the actual payload for the merchandise category 204 has been received, and thus the dummy node can be filled in with this information. This information may also include information about dependencies for the merchandise category 204, which can then also have dummy nodes created for them. Specifically, dummy nodes may be created for merchandise category hierarchical elements 300 and 302 as well as for a characteristic 304. This would allow the merchandise category 204 to be searchable even though the payloads for its dependent nodes have not yet been received.

It should be noted that the user can not only search through the nodes, but also browse through them as well.

Figure 4:
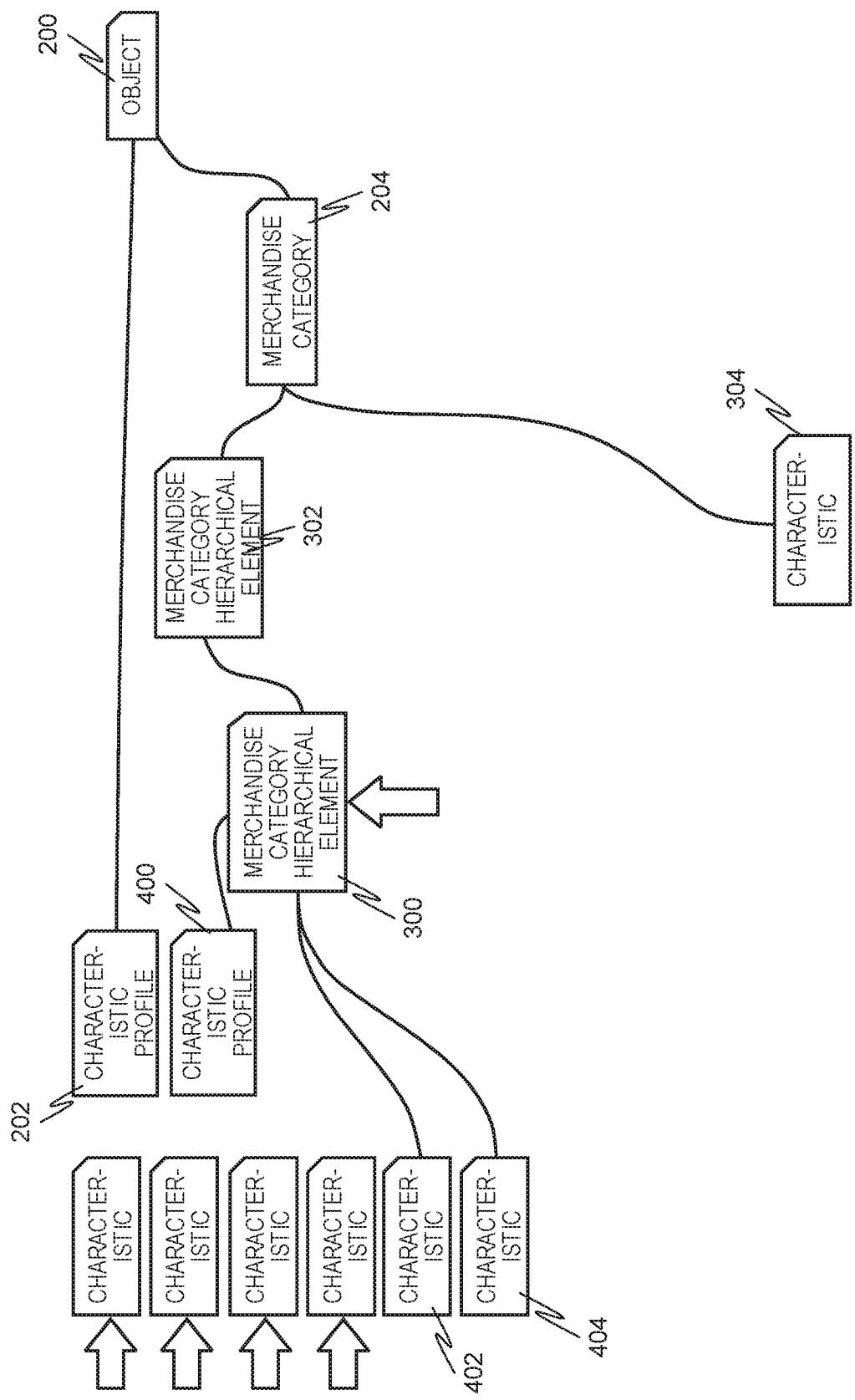
FIG. 4 is a block diagram illustrating further receipt of a hierarchy in accordance with an example embodiment.

FIG. 4 is a block diagram illustrating further partial receipt of a hierarchy in accordance with an example embodiment. Here, the actual payload for the merchandise category hierarchical element 300 has been received, and thus the dummy node can be filled in with this information. Specifically, dummy nodes may be created for a characteristic profile 400 as well as for characteristics 402 and 404. Once the payloads for the characteristics 402 and 404 are received, then a user performing a search on the object 200 will be able to see that it has characteristics 402 and 404 and know what those characteristics are, as well as knowing that it has been assigned to the merchandise category 204 and the merchandise category hierarchical elements 300 and 302, even though there may be some additional characteristics assigned to the object 200 which have payloads that have not arrived yet.

Figure 5:
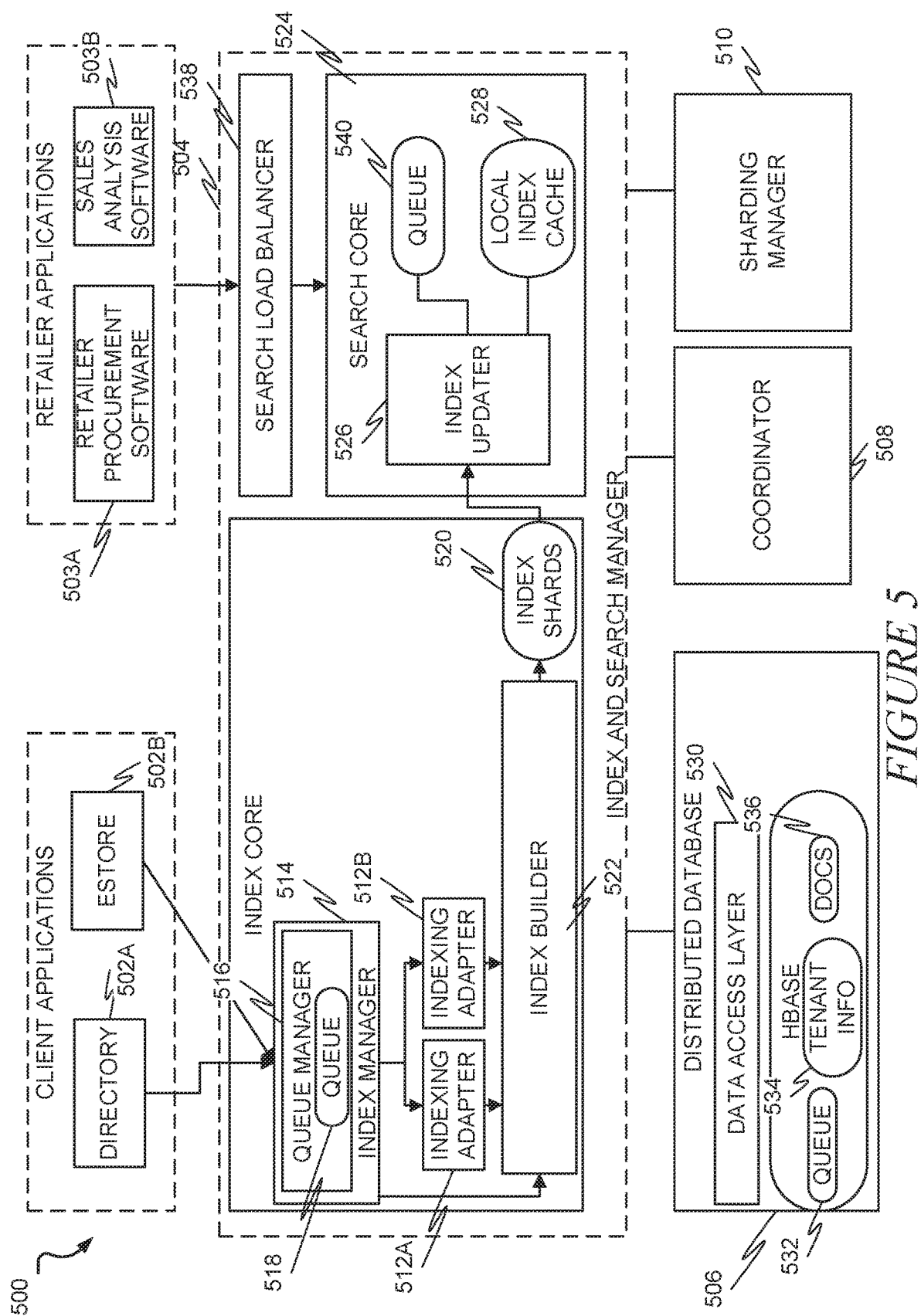
FIG. 5 is a block diagram illustrating a system, in accordance with an example embodiment, for retail procurement.

FIG. 5 is a block diagram illustrating a system 500, in accordance with an example embodiment, for retail procurement. The system 500 includes one or more client applications 502A, 502B, one or more retailer applications 503A, 503B, an index and search manager 504, a distributed database 506, a coordinator 508, and a sharding manager 510. Each client application 502A, 502B may represent a different application providing data to be indexed and eventually searched by the system 500. A single tenant (e.g., a customer such as a manufacturer) may provide multiple clients, while other tenants may provide just a single client. In the depicted figure, the client application 502A is or includes a directory application, and the client application 502B is or includes an eStore application. Also in the depicted figure, the retailer application 503A is or includes retailer procurement software, whereas the retailer application 503B is or includes sales analysis software.

The client applications 502A, 502B may provide data about nodes in a hierarchy of objects (such as articles in a product directory), categories, characteristics, and/or characteristic profiles in chunks that are received in potentially random order by the index and search manager 504.

For each client application 502A, 502B, an indexing adapter 512A, 512B may be provided. Each indexing adapter 512A, 512B can include a parser created to parse document types supported by the corresponding client application 502A, 502B. As an example, the client application 502A providing directory data may utilize the indexing adapter 512A, which may include a CIF parser (to parse primary CIF directory data) and various XML parsers for the auxiliary data, such as kit information, Units of Measure (UOM) maps, etc. Each parser may have two modes. The first mode can parse the byte stream of the incoming documents into rows. The second mode can parse the rows into an indexable object.

As pictured, the indexing adapters 512A, 512B may actually be contained in the index and search manager 504. An index manager 514 may act to manage the indexing process. This may include a queue manager 516 which manages a queue 518 containing incoming data from the client applications 502A, 502B which needs to be indexed. The index manager 514 may act to send data at the front of the queue 518 to the appropriate indexing adapter 512A, 512B for the corresponding client application 502A, 502B while also building a request to an index builder 522.

In an example embodiment, the index manager 514 may have a redundant architecture that provides an application programming interface (API) to the client applications 502A, 502B to allow the client applications 502A, 502B to submit indexing jobs. The indexing message produced through the API may contain enough information to uniquely identify the request. This identification could be used to track the status of the submitted jobs.

The index manager 514 may utilize feedback from the distributed database 506 to decide on the indexing jobs to be run in the distributed database 506 to allow a scalable computing architecture for building index shards 520. Specifically, the index manager 514 may send a request to build an index to the index builder 522, which may build the index shards 520. A search core 524 may contain an index updater 526, which can take the index shards 520 and update a local index cache 528 using the index shards 520. This local index cache 528 can then be synchronized with a network file system, which can then distribute the index to the distributed database 506. Each index shard 520 is a subset of the index for a given file type. For example, a shard could include directory objects from a subset of tenants. For large directories, a single directory may span multiple index shards 520.

The distributed database may 506 may contain a data access layer 530, a queue 532, tenant information 534, and documents 536.

The search core 524 may host search queries from the retailer applications 503A, 503B via a search load balancer 538, which acts to balance the load of search requests among multiple instantiations of the search core 524 on multiple physical or logical servers. The search core 524 may also expose a Representational State Transfer (REST)-based search and faceting API (not pictured). The search core 524 may perform aggregation, faceting, ranking, and relevance algorithms on search results. The source documents are primary indexing targets. Each source document may store a document identification key for auxiliary data. In an example embodiment, the auxiliary data itself is stored in the same index shard 520. This allows for locality of reference, so that an auxiliary data object related to a primary data object can be easily retrieved during a search.

The search core 524 may keep track of recent changes to the local index cache 528 in a special queue 540 for receiving the updates to support search. The updates may be immediately applied to the reader but may be batched before committing to the local index segments.

The index manager 514 may use information from the coordinator 508 and the sharding manager 510 to decide on the indexing jobs to be run in the distributed database 506 to allow a scalable computing architecture for building the index shards 520.

Each index shard 520 may contain Lucene index segments for a set of tenants, as will be described in more detail below. The job of indexing may be designed as a map-reduce job that parses the source document and any auxiliary documents to create the Lucene index segments.

Within the local index cache 528, the primary documents may be modeled as Lucene "documents." The document fields, their indexing properties (stored, indexed, etc.), norms, etc. may be modeled in the bundle providing the local index cache 528. The auxiliary document identifications may be stored in the Lucene document for linking the auxiliary data. The actual auxiliary documents may be stored in the same index as separate documents. For example, a single shard may contain documents relating to a first tenant, including a first directory object (with object attributes and supplier identification), a second directory object (with object attributes and supplier identification), a third directory object (with object attributes and supplier identification), and a supplier document with three different supplier detail files. The supplier document is a single document, with the supplier detail files being auxiliary documents. The supplier document may be stored with a key matching the supplier identification field in each source document in the index.

The coordinator 508 may implement a protocol for routing, shard configuration, rolling-apply, and other management functions. The coordinator 508 may additionally provide the node status and consensus protocol.

The sharding manager 510 may implement the elasticity architecture for distributing the index across search cores 524. In an example embodiment, the sharding manager 510 may receive a HyperText Transfer Protocol (HTTP) request for a search and may be aware of which search core 524 can respond to this request. It can then route the request to the specific search core 524, perhaps based at least partially on load balancing if multiple search cores 524 can respond to the request. The search core 524 may then use libraries to parse the queries and launch a search, and then respond with matches found, in an extensible markup language (XML) document. The XML document may comprise primary data along with the supporting auxiliary data. Notably, the search core 524 may perform these searches on partial data, namely when localization information for only some but not all of the nodes in the hierarchy has been received, as described above. The index builder 522 may form the dummy nodes described earlier.

Figure 6:
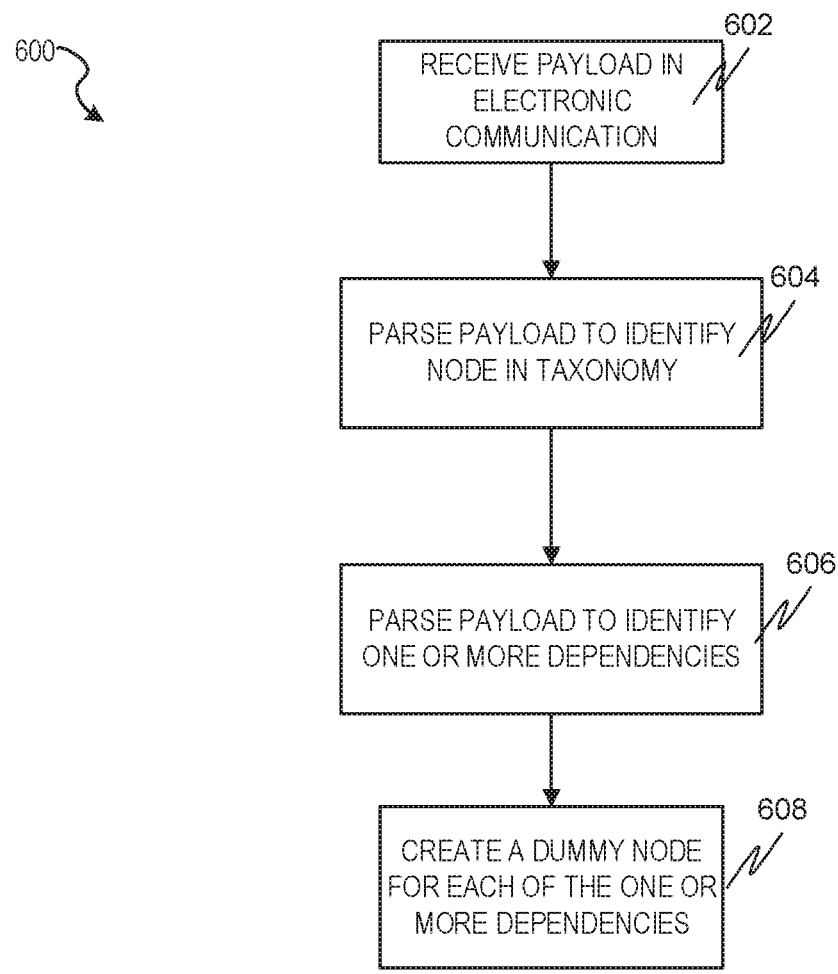
FIG. 6 is a flow diagram illustrating a method, in accordance with an example embodiment, for providing search capability on partially received data in a computer system.

FIG. 6 is a flow diagram illustrating a method 600, in accordance with an example embodiment, for providing search capability on partially received data in a computer system. At operation 602, a payload is received in an electronic communication. This electronic communication may, for example, be an HTTP transmission. At operation 604, the payload is parsed to identify a node in a taxonomy to which the payload applies. At operation 606, the payload is parsed to identify one or more dependencies. At operation 608, for each of the identified one or more dependencies, a dummy node is created in the taxonomy. The dummy node is created to include whatever information the payload has about the corresponding dependency, such as an identification of the corresponding category, characteristic, or characteristic profile that corresponds to the dependency.

Figure 7A:
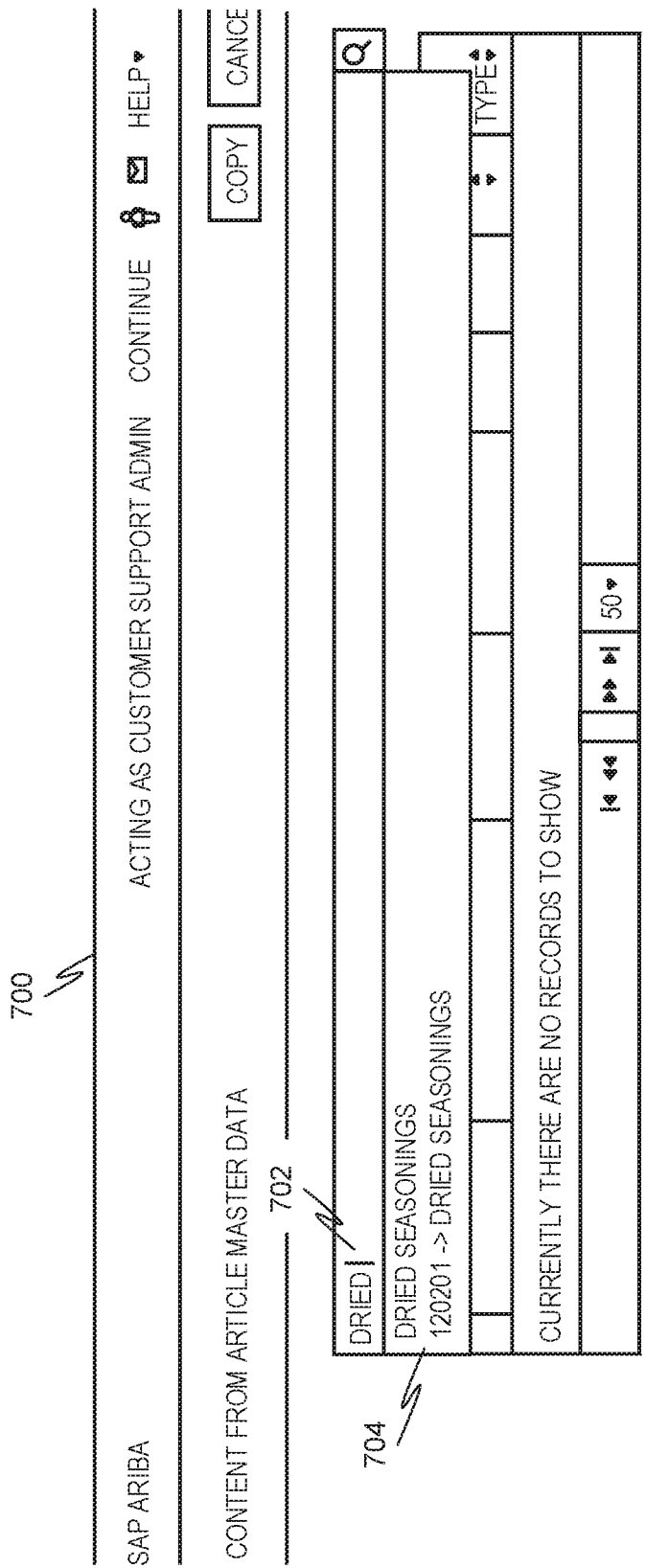
Figure 7B:
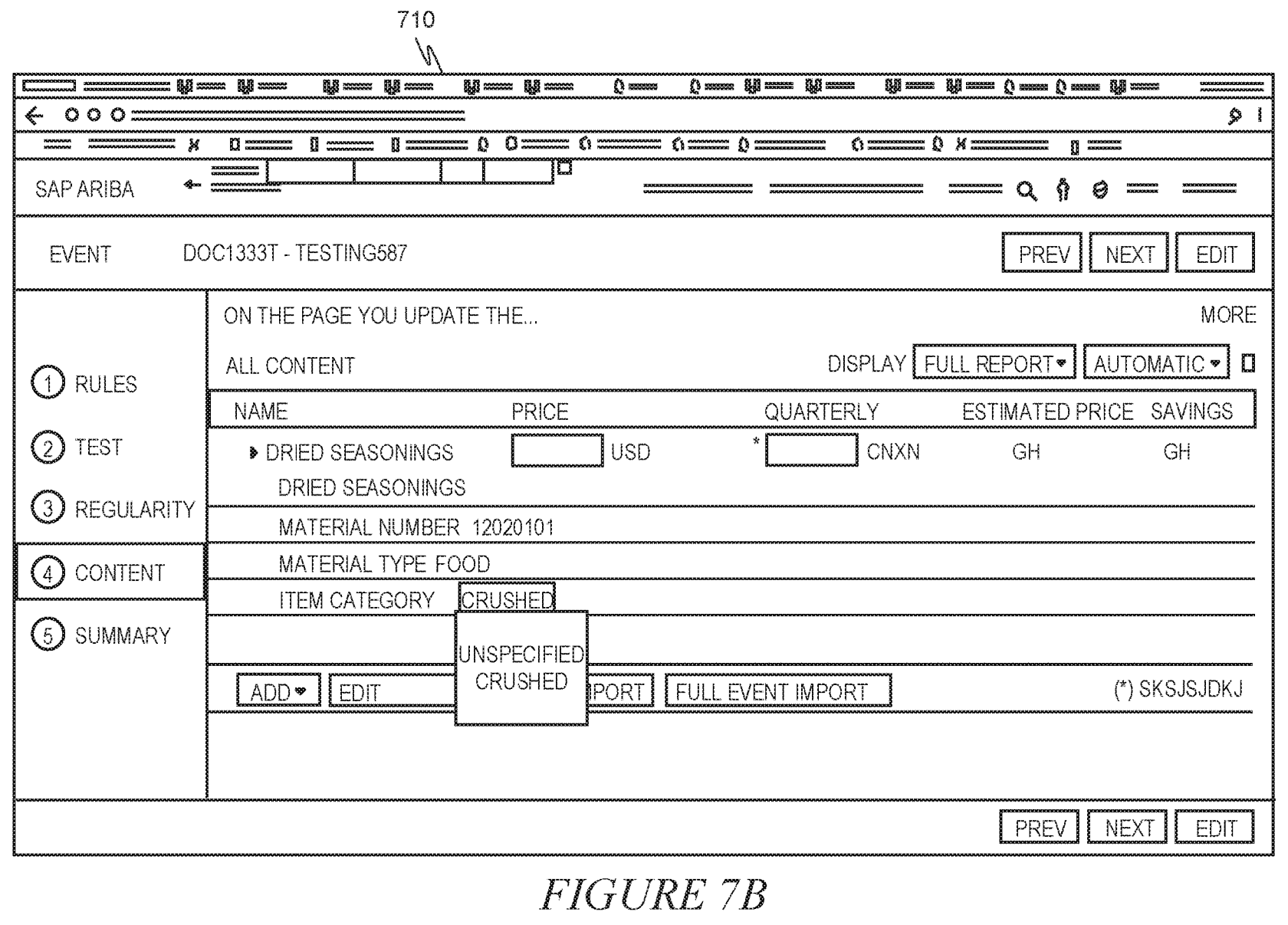

FIGS. 7A and 7B are screen diagrams illustrating graphical user interfaces for displaying search results from a partially received hierarchy in accordance with an example embodiment. Here, information about a product called "dried seasonings" has been received along with a category identification and characteristic identifications assigned to this product, but neither the characteristic nor the category payload has been received. The article name is made searchable through use of the above-described techniques, however, and thus in a graphical user interface 700 of FIG. 7A, when a user types the term "dried" into a search box 702, the system is able to make an autocomplete suggestion of a term "dried seasonings" 704 in the graphical user interface 700. Notably, the system is also able to provide the information it does have about, for example, the category (which at this point is just the category ID 120201, but not the localized name for that category because that information has not yet been received).

A graphical user interface 710 in FIG. 7B is then able to provide the user with the ability to copy the product to an event.

Figure 7C:
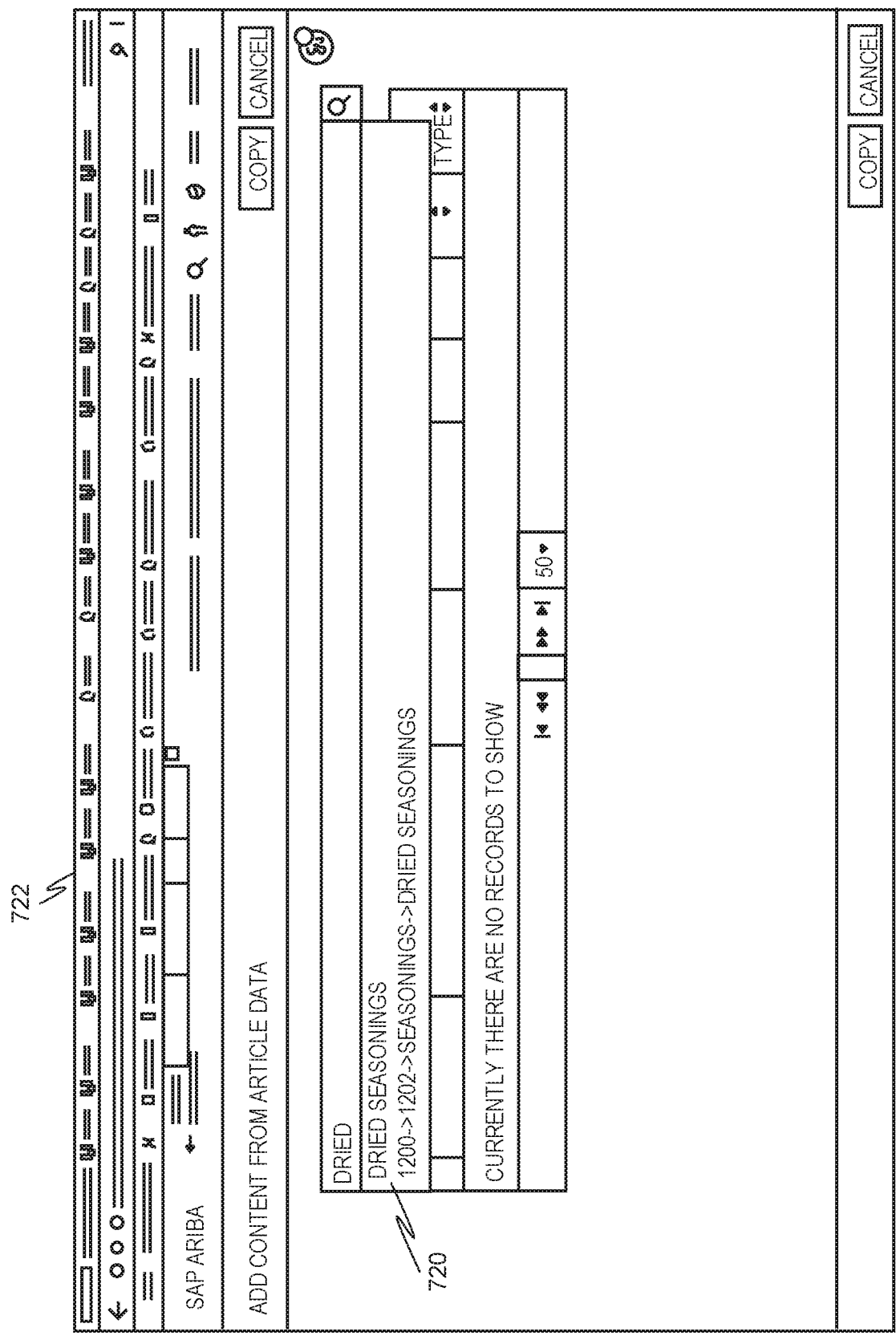
Figure 7D:
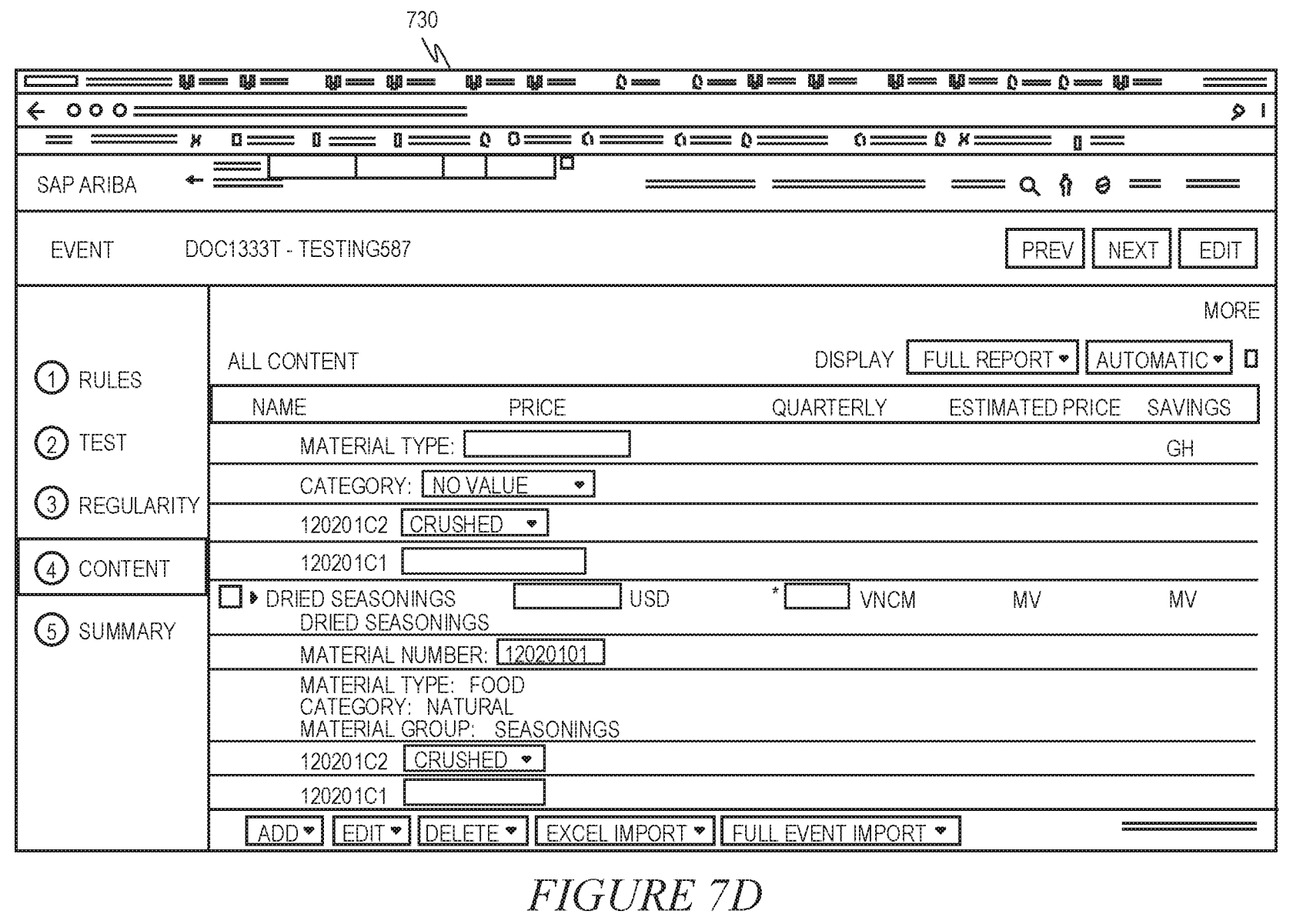

FIGS. 7C and 7D are screen diagrams illustrating further graphical user interfaces for displaying search results from a partially received hierarchy in accordance with an example embodiment. As shown in FIG. 7C, the payload for the category with category ID 120201 has now been received, which identifies the English name for this category as "Seasonings." As such, an autocomplete suggestion 720 now reflects the category name. Additionally, the payload for seasonings has identified that it itself depends on additional categories with category IDs 1200 and 1202, which are now depicted in a graphical user interface 722.

A graphical user interface 730 in FIG. 7D now allows the user to copy this additional information to the event.

Thus, a system is provided where even partial data received for an object hierarchy is sufficient for searching even though auxiliary data has not yet arrived. This allows the system to be used via a graphical user interface as early as possible, thus making retail integration fast and more quickly available. Furthermore, users are then able to begin the procurement process more quickly.

EXAMPLES

Example 1

A system comprising:
  one or more hardware processors configured to perform operations of:
  receiving a first payload in a first electronic communication, the first payload containing localization information regarding a first node in a taxonomy of objects, categories, and characteristics, the localization information including information about an object, category, or characteristic corresponding to the first node;

parsing the first payload to identify one or more dependencies among two or more of the objects, categories, or characteristics;
for each of the one or more dependencies:
creating a dummy node, corresponding to the dependency, in the taxonomy, the dummy node containing information about the dependency identified in the first payload; and
providing a search mechanism to a graphical user interface, the search mechanism configured to receive user interactions from a user and cause the one or more hardware processors to retrieve and cause display of information in one or more of the dummy nodes in the taxonomy.

Example 2

The system of Example 1, wherein the operations further comprise providing an event assignment mechanism to the graphical user interface, the event assignment mechanism designed to receive user interactions from the user and cause the one or more hardware processors to add selected information from one or more of the dummy nodes in the taxonomy to a sourcing event.

Example 3

The system of Example 1 or 2, wherein leaf nodes in the taxonomy correspond to objects available for sourcing.

Example 4

The system of any of Examples 1-3, wherein the information about the dependency includes a unique identification of a category or characteristic corresponding to the dependency.

Example 5

The system of any of Examples 1-4 wherein the operations further comprise:
receiving a second payload in a second electronic communication, the second payload containing localization information regarding a dummy node in the taxonomy;
adding the localization information regarding the dummy node to the dummy node to which it corresponds;
parsing the second payload to identify one or more additional dependencies; and
for each of the one or more additional dependencies:
creating a dummy node in the taxonomy corresponding to the additional dependency, the dummy node containing information about the additional dependency from the second payload.

Example 6

The system of any of Examples 1-5, wherein the first and second electronic communications are received from an Enterprise Resource Planning (ERP) system.

Example 7

The system of any of Examples 1-6, wherein the first payload is received prior to a payload providing localization information regarding one of its dependencies.

Example 8

A method comprising:
receiving a first payload in a first electronic communication, the first payload containing localization information regarding a first node in a taxonomy of objects, categories, and characteristics, the localization information including information about an object, category, or characteristic corresponding to the first node;
parsing the first payload to identify one or more dependencies among two or more of the objects, categories, or characteristics;
for each of the one or more dependencies:
creating a dummy node, corresponding to the dependency, in the taxonomy, the dummy node containing information about the dependency identified in the first payload; and
providing a search mechanism to a graphical user interface, the search mechanism configured to receive user interactions from a user and cause the one or more hardware processors to retrieve and cause display of information in one or more of the dummy nodes in the taxonomy.

Example 9

The method of Example 8, further comprising providing an event assignment mechanism to the graphical user interface, the event assignment mechanism designed to receive user interactions from the user and cause the one or more hardware processors to add selected information from one or more of the dummy nodes in the taxonomy to a sourcing event.

Example 10

The method of any of Examples 8-9, wherein leaf nodes in the taxonomy correspond to objects available for sourcing.

Example 11

The method of any of Examples 8-10, wherein the information about the dependency includes a unique identification of a category or characteristic corresponding to the dependency.

Example 12

The method of any of Examples 8-11, further comprising:
receiving a second payload in a second electronic communication, the second payload containing localization information regarding a dummy node in the taxonomy;
adding the localization information regarding the dummy node to the dummy node to which it corresponds;
parsing the second payload to identify one or more additional dependencies; and
for each of the one or more additional dependencies:
creating a dummy node in the taxonomy corresponding to the additional dependency, the dummy node containing information about the additional dependency from the second payload.

Example 13

The method of any of Examples 8-12, wherein the first and second electronic communications are received from an Enterprise Resource Planning (ERP) system.

Example 14

The method of any of Examples 8-13, wherein the first payload is received prior to a payload providing localization information regarding one of its dependencies.

Example 15

A machine-readable storage medium embodying instructions that, when executed by a machine, cause the machine to perform operations comprising:
receiving a first payload in a first electronic communication, the first payload containing localization information regarding a first node in a taxonomy of objects, categories, and characteristics, the localization information including information about an object, category, or characteristic corresponding to the first node;
parsing the first payload to identify one or more dependencies among two or more of the objects, categories, or characteristics;
for each of the one or more dependencies:
 creating a dummy node, corresponding to the dependency, in the taxonomy, the dummy node containing information about the dependency identified in the first payload; and
providing a search mechanism to a graphical user interface, the search mechanism configured to receive user interactions from a user and cause the one or more hardware processors to retrieve and cause display of information in one or more of the dummy nodes in the taxonomy.

Example 16

The machine-readable storage medium of Example 15, wherein the operations further comprise providing an event assignment mechanism to the graphical user interface, the event assignment mechanism designed to receive user interactions from the user and cause the machine to add selected information from one or more of the dummy nodes in the taxonomy to a sourcing event.

Example 17

The machine-readable storage medium of Example 15 or 16, wherein leaf nodes in the taxonomy correspond to objects available for sourcing.

Example 18

The machine-readable storage medium of any of Examples 15-17, wherein the information about the dependency includes a unique identification of a category or characteristic corresponding to the dependency.

Example 19

The machine-readable storage medium of any of Examples 15-18, wherein the operations further comprise:
receiving a second payload in a second electronic communication, the second payload containing localization information regarding a dummy node in the taxonomy;
adding the localization information regarding the dummy node to the dummy node to which it corresponds;
parsing the second payload to identify one or more additional dependencies; and
for each of the one or more additional dependencies:
 creating a dummy node in the taxonomy corresponding to the additional dependency, the dummy node containing information about the additional dependency from the second payload.

Example 20

The machine-readable storage medium of any of Examples 15-19, wherein the first and second electronic communications are received from an Enterprise Resource Planning (ERP) system.

Figure 8:
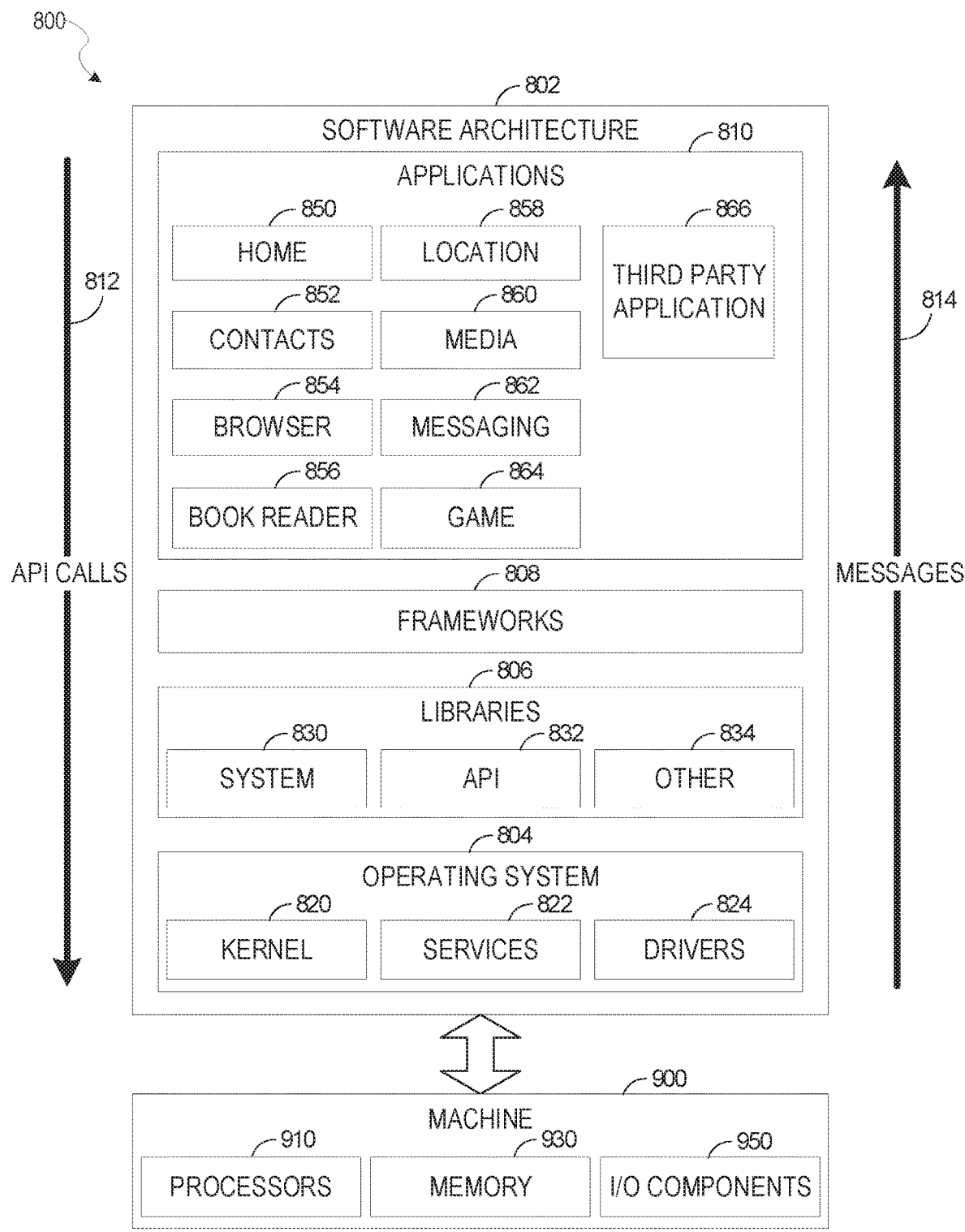
FIG. 8 is a block diagram illustrating an architecture of software, which can be installed on any one or more of the devices described above.

FIG. 8 is a block diagram 800 illustrating an architecture of software 802, which can be installed on any one or more of the devices described above. FIG. 8 is merely a non-limiting example of a software architecture, and it will be appreciated that many other architectures can be implemented to facilitate the functionality described herein. In various embodiments, the software 802 is implemented by hardware such as a machine 900 of FIG. 9 that includes processors 910, memory 930, and input/output (I/O) components 950. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
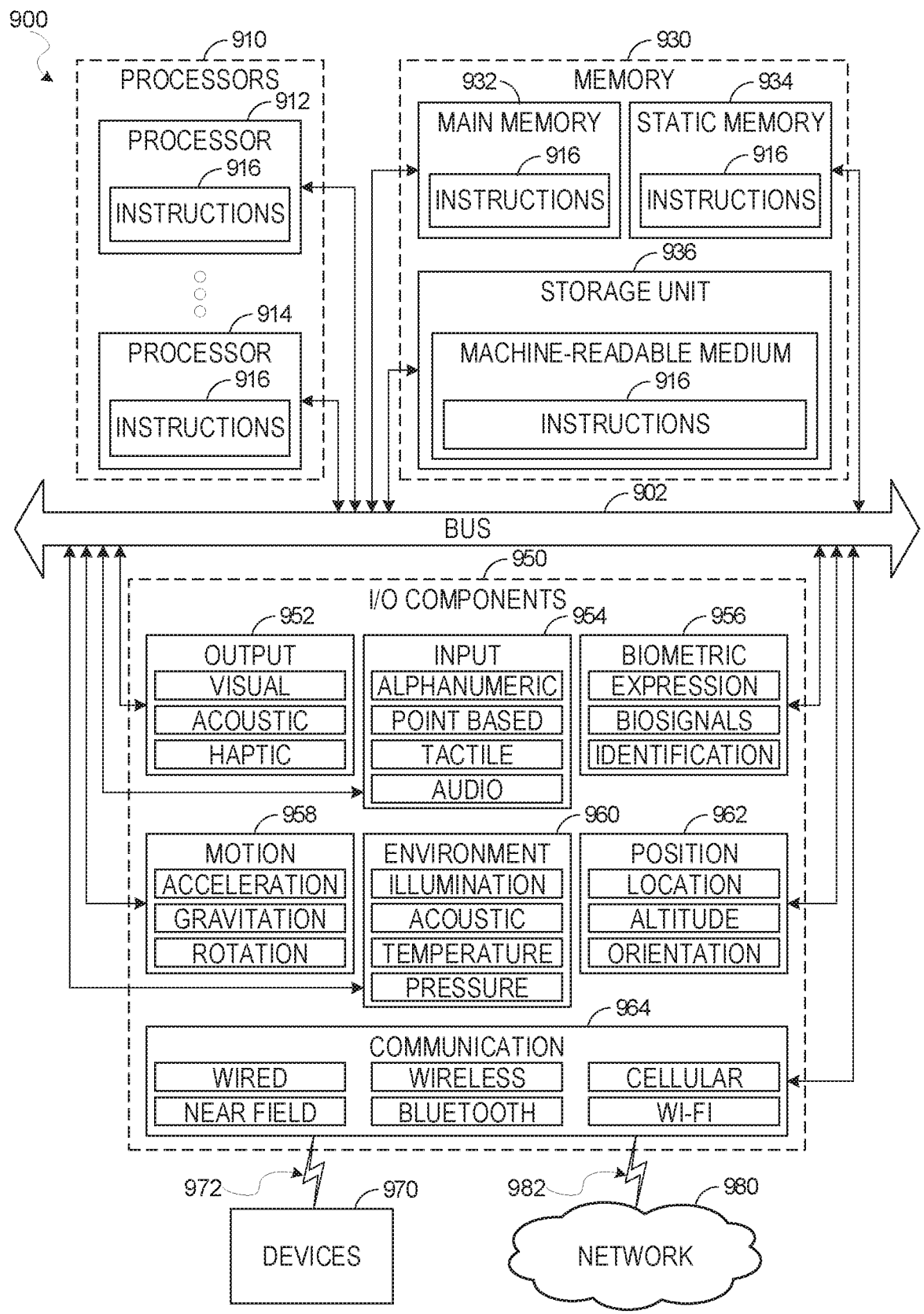
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 600 of FIG. 6. Additionally, or alternatively, the instructions 916 may implement FIGS. 1-8, and so forth. The instructions 916 transform the general, non-programmed machine 900 into a particular machine 900 programmed to cans out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components. Near Field Communication (NFC) components, Bluetooth® components (e.g., Bluetooth® Low Energy), components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include RFID tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   one or more hardware processors configured to perform operations comprising:
   receiving a first payload in a first electronic communication, the first payload containing localization information regarding a first node in a taxonomy of objects, categories, and characteristics, the localization information including information about an object, category, or characteristic corresponding to the first node;
   parsing the first payload to identify one or more dependencies among two or more of the objects, categories, or characteristics;
   for each of the one or more dependencies:
      creating a dummy node, corresponding to the dependency, in the taxonomy, the dummy node containing information about the dependency identified in the first payload; and
   providing a search mechanism to a graphical user interface, the search mechanism configured to receive user interactions from a user and cause the one or more hardware processors to retrieve and cause display of information in one or more of the dummy nodes in the taxonomy.

2. The system of claim 1, wherein the operations further comprise providing an event assignment mechanism to the graphical user interface, the event assignment mechanism designed to receive user interactions from the user and cause the one or more hardware processors to add selected information from one or more of the dummy nodes in the taxonomy to a sourcing event.

3. The system of claim 1, wherein leaf nodes in the taxonomy correspond to objects available for sourcing.

4. The system of claim 1, wherein the information about the dependency includes a unique identification of a category or characteristic corresponding to the dependency.

5. The system of claim 1, wherein the operations further comprise:
   receiving a second payload in a second electronic communication, the second payload containing localization information regarding a dummy node in the taxonomy;
   adding the localization information regarding the dummy node to the dummy node to which it corresponds;
   parsing the second payload to identify one or more additional dependencies; and
   for each of the one or more additional dependencies:
      creating a dummy node in the taxonomy corresponding to the additional dependency, the dummy node containing information about the additional dependency from the second payload.

6. The system of claim 5, wherein the first and second electronic communications are received from an Enterprise Resource Planning (ERP) system.

7. The system of claim 1, wherein the first payload is received prior to a payload providing localization information regarding one of its dependencies.

8. A method comprising:
   receiving a first payload in a first electronic communication, the first payload containing localization information regarding a first node in a taxonomy of objects, categories, and characteristics, the localization information including information about an object, category, or characteristic corresponding to the first node;
   parsing the first payload to identify one or more dependencies among two or more of the objects, categories, or characteristics;
   for each of the one or more dependencies:
      creating a dummy node, corresponding to the dependency, in the taxonomy, the dummy node containing information about the dependency identified in the first payload; and
   providing a search mechanism to a graphical user interface, the search mechanism configured to receive user interactions from a user and cause the one or more hardware processors to retrieve and cause display of information in one or more of the dummy nodes in the taxonomy.

9. The method of claim 8, further comprising providing an event assignment mechanism to the graphical user interface, the event assignment mechanism designed to receive user interactions from the user and cause the one or more hardware processors to add selected information from one or more of the dummy nodes in the taxonomy to a sourcing event.

10. The method of claim 8, wherein leaf nodes in the taxonomy correspond to objects available for sourcing.

11. The method of claim 8, wherein the information about the dependency includes a unique identification of a category or characteristic corresponding to the dependency.

12. The method of claim 8, further comprising:
   receiving a second payload in a second electronic communication, the second payload containing localization information regarding a dummy node in the taxonomy;
   adding the localization information regarding the dummy node to the dummy node to which it corresponds;
   parsing the second payload to identify one or more additional dependencies; and for each of the one or more additional dependencies:
            creating a dummy node in the taxonomy corresponding to the additional dependency, the dummy node containing information about the additional dependency from the second payload.
    13. The method of claim 12, wherein the first and second electronic communications are received from an Enterprise Resource Planning (ERP) system.
    14. The method of claim 8, wherein the first payload is received prior to a payload providing localization information regarding one of its dependencies.
    15. A machine-readable storage medium embodying instructions that, when executed by a machine, cause the machine to perform operations comprising:
        receiving a first payload in a first electronic communication, the first payload containing localization information regarding a first node in a taxonomy of objects, categories, and characteristics, the localization information including information about an object, category, or characteristic corresponding to the first node;
        parsing the first payload to identify one or more dependencies among two or more of the objects, categories, or characteristics;
        for each of the one or more dependencies:
            creating a dummy node, corresponding to the dependency, in the taxonomy, the dummy node containing information about the dependency identified in the first payload; and
        providing a search mechanism to a graphical user interface, the search mechanism configured to receive user interactions from a user and cause the one or more hardware processors to retrieve and cause display of information in one or more of the dummy nodes in the taxonomy.
    16. The machine-readable storage medium of claim 15, wherein the operations further comprise providing an event assignment mechanism to the graphical user interface, the event assignment mechanism designed to receive user interactions from the user and cause the machine to add selected information from one or more of the dummy nodes in the taxonomy to a sourcing event.
    17. The machine-readable storage medium of claim 15, wherein leaf nodes in the taxonomy correspond to objects available for sourcing.
    18. The machine-readable storage medium of claim 15, wherein the information about the dependency includes a unique identification of a category or characteristic corresponding to the dependency.
    19. The machine-readable storage medium of claim 15, wherein the operations further comprise:
        receiving a second payload in a second electronic communication, the second payload containing localization information regarding a dummy node in the taxonomy;
        adding the localization information regarding the dummy node to the dummy node to which it corresponds;
        parsing the second payload to identify one or more additional dependencies; and
        for each of the one or more additional dependencies:
            creating a dummy node in the taxonomy corresponding to the additional dependency, the dummy node containing information about the additional dependency from the second payload.
    20. The machine-readable storage medium of claim 19, wherein the first and second electronic communications are received from an Enterprise Resource Planning (ERP) system.

* * * * *